May 15, 1956

R. J. WALTER 2,745,677

TANDEM AXLE SUSPENSION FOR VEHICLES

Filed July 8, 1953

INVENTOR.
Robert J. Walter
BY Popp and Sommer
Attorneys.

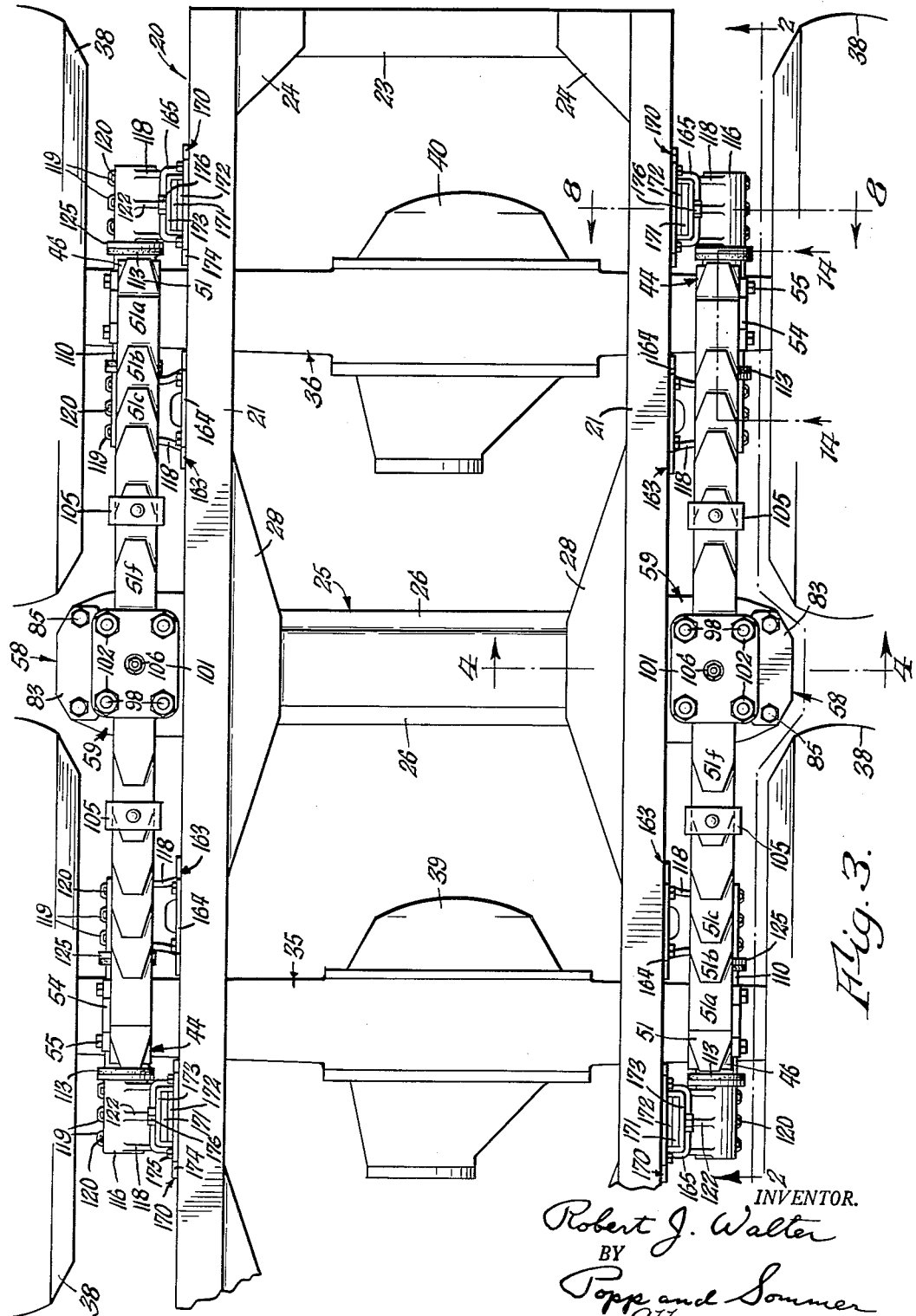

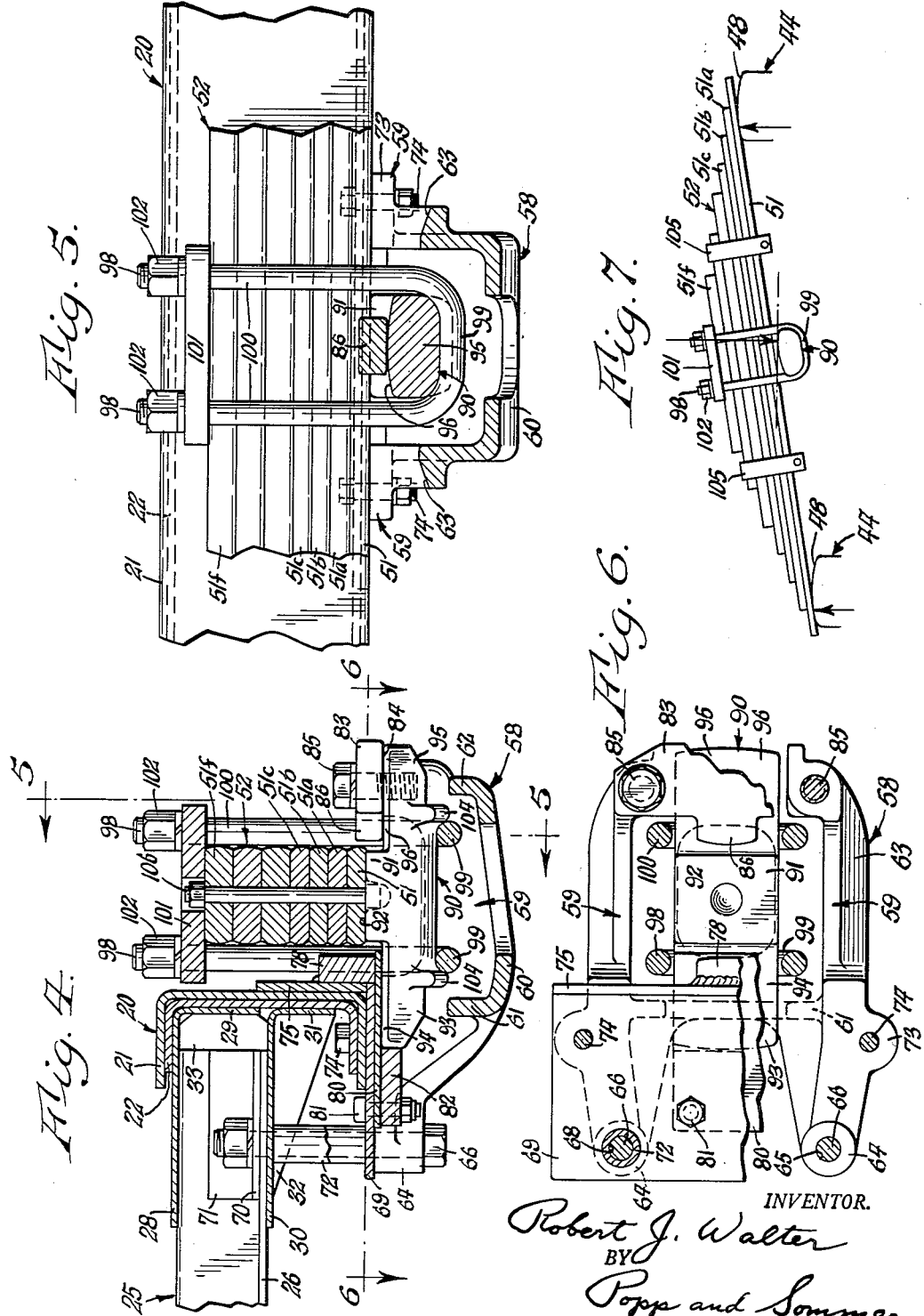

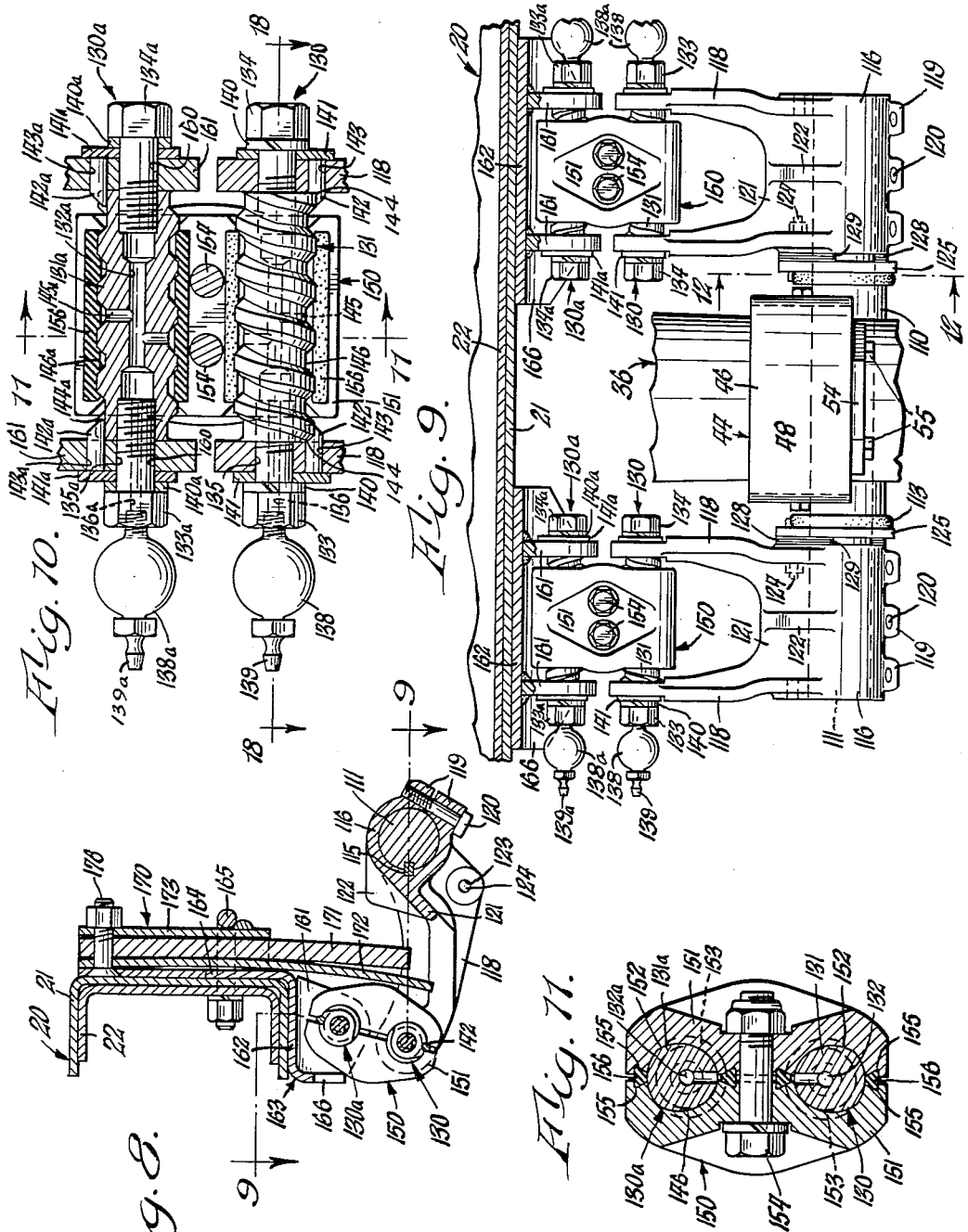

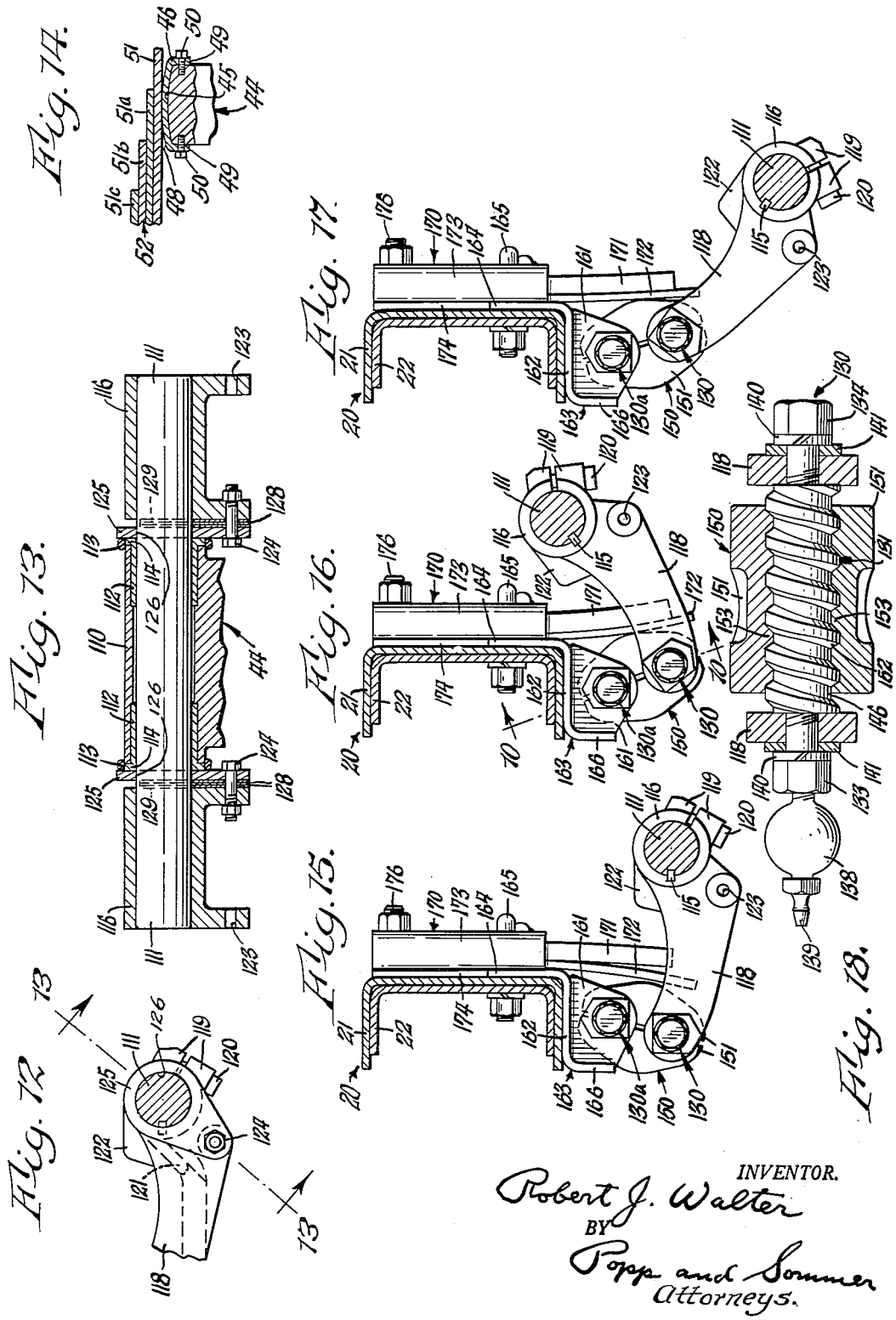

United States Patent Office 2,745,677
Patented May 15, 1956

2,745,677
TANDEM AXLE SUSPENSION FOR VEHICLES

Robert J. Walter, Kenmore, N. Y., assignor to Truck Equipment Co. Inc., Buffalo, N. Y., a corporation of New York Application July 8, 1953, Serial No. 366,786

18 Claims. (Cl. 280—104.5)

This invention relates to a tandem axle suspension particularly for trucks in which each axle is permitted to move against a resilient resistance both vertically and laterally relative to the vehicle frame.

General objects of the present invention are to provide a suspension (1) which will function to safely support the vehicle body at high speeds, both when loaded and unloaded; (2) which reduces and cushions both the vertical and lateral impacts from the axles against the body of the vehicle, both when the vehicle is loaded and unloaded and without imposing undue end thrusts on the pivotal connections which connect the axles to the body; (3) in which side sway is reduced and in which periodic vibration of the suspension is dampened out and in which wheel tramp is avoided; (4) in which all forces are cushioned so as to increase gasoline and tire mileage; (5) which has light unsprung weight; (6) in which the metal stresses are within safe working limits of heat treated castings or forgings; (7) which can be produced at low cost and in particular requires only simple machining operations; (8) which can be easily taken down and repaired; (9) in which any desired degree or frequency of spring deflection can be obtained; (10) in which one or both of the tandem axles are self-steering so that when rounding a curve, one or both tandem axles are caused to assume such an angle relative to each other as will enable a pure rolling action to be obtained; (11) which includes compensating means connecting the companion ends of the tandem axles and through which the excess load on either axle is transmitted to the other axle; (12) in which the transfer of the load from the tandem axles to the front axle of the vehicle, under braking reaction, is identical with the similar transfer of the load in a two axle vehicle of the same wheel base, weight and load; (13) in which load carrying connections to the frame are intermediate the tandem axles thereby to reduce to a minimum any distortion of the suspension through weaving of the frame; (14) in which the connections to the frame are made principally to the longitudinal side bars thereof to simplify the installation of the suspension and design of the frame and suspension; and (15) which will stand up under conditions of severe and constant use with very little servicing.

An important specific object of the present invention is to provide a suspension having the above features in which load transfer or axle compensation is obtained through elongated generally horizontal walking beam supporting members, preferably in the form of main leaf springs, have rocking connections with the frame at their centers and are connected at their ends to the ends of tandem axles so that load transfer from one axle to the other is effected directly through the elongated supporting members or walking beams.

A further important specific object of the present invention is to provide such a rocking mounting for the elongated supporting members or walking beams which will permit cushioned lateral axle movement, that is, movement of either of the axles lengthwise of its axis.

A further important object of the invention is to provide a control linkage or mechanism for resiliently limiting such lateral axle movement, and which includes springs of graduated resistance so that this cushioning is gradual.

Another most important specific object of the invention is to provide, in such a control linkage, simple and effective means for rendering the tandem axles self-steering, the lateral movement of either axle being translated by this control linkage into a slight turning movement of the axle about a vertical axis and in such direction as to cause the axle to track when making a turn without tire scuffing or loss of power.

Another important object of the present invention is to provide a simplified shackle and shackle pin construction whereby such a self-steering action of the tandem axle is obtained.

Other objects and advantages of the invention will be apparent from the following description and drawings in which:

Fig. 3 is a top plan view of the rear end of a truck frame supported on a tandem axle suspension embodying the present invention.

Fig. 4 is an enlarged fragmentary vertical transverse section taken on line 4—4, Fig. 3.

Fig. 5 is a fragmentary vertical fore-and-aft section taken generally on line 5—5, Fig. 4.

Fig. 6 is a fragmentary horizontal section taken generally on line 6—6, Fig. 4.

Fig. 7 is a diagrammatic side elevational view of parts of the suspension and in particular illustrating the compensating or load transfer function of the main leaf springs of the suspension.

Fig. 8 is an enlarged vertical transverse section taken generally on line 8—8, Fig. 3.

Fig. 9 is a section through the control linkage and taken generally on line 9—9, Fig. 8.

Fig. 10 is an enlarged generally vertical section taken generally on line 10—10, Fig. 16.

Fig. 11 is a vertical section take on line 11—11, Fig. 10.

Fig. 12 is a vertical section taken on line 12—12, Fig. 9.

Fig. 13 is a section taken generally on line 13—13, Fig. 12.

Fig. 14 is an enlarged vertical section taken generally on line 14—14, Fig. 3.

Figs. 15, 16 and 17 are views generally similar to Fig. 8 and showing three different positions of the parts.

Fig. 18 is a section taken generally on line 18—18, Fig. 10.

Figure 1:
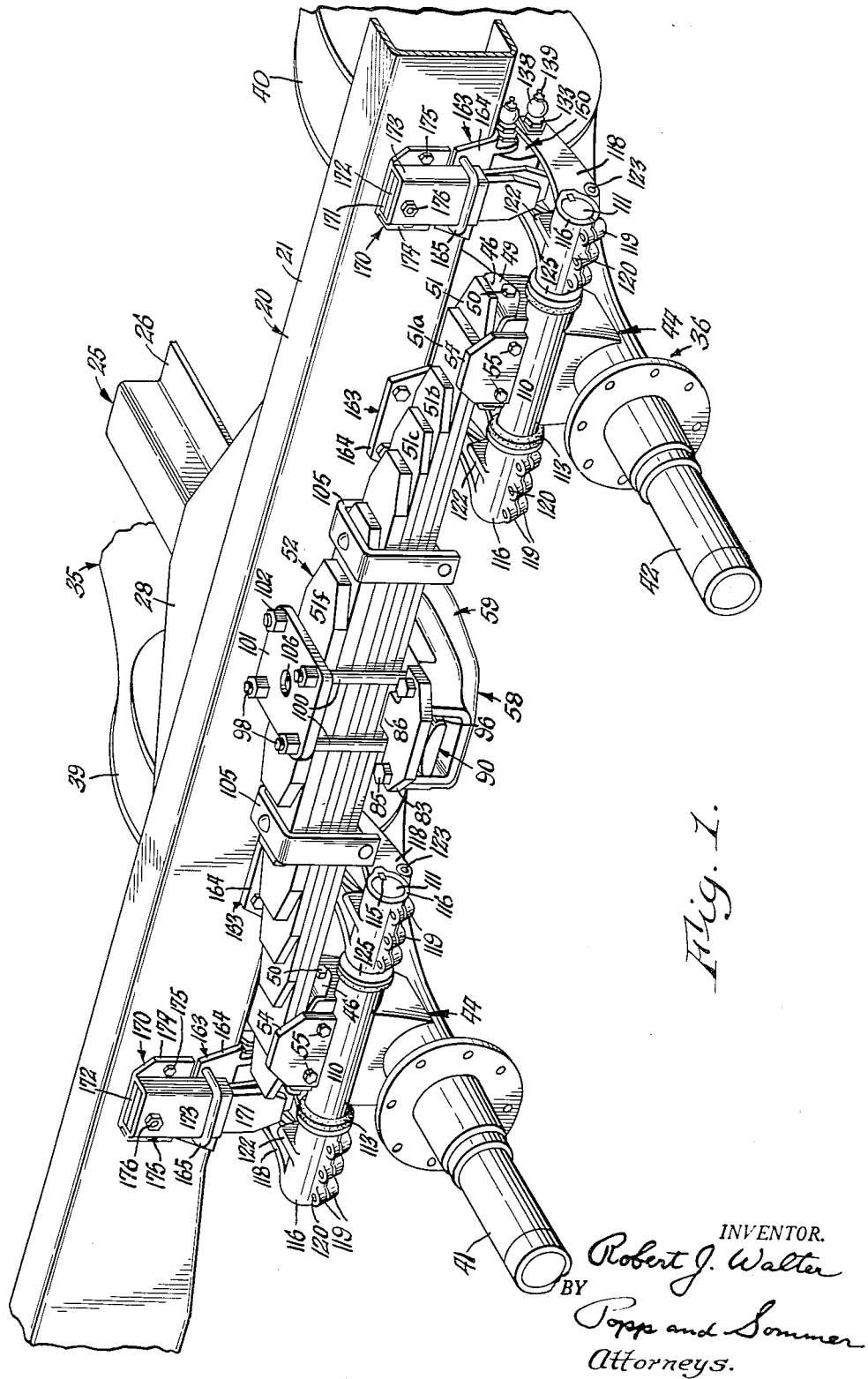
Fig. 1 is a fragmentary perspective view of one end of a tandem axle suspension supporting a vehicle frame and embodying the present invention.

This invention is shown in connection with a highway truck, the frame 20 of which is shown as including a pair of main longitudinal side frame bars 21 of channel shape in cross section and arranged with their channels opposing each other. Above the tandem axles these longitudinal side frame bars 21 can be reinforced by internal channels 22 fitted and welded therein as shown in Fig. 4. These longitudinal side frame bars 21 of the frame are joined at their rear extremities by a rear cross bar 23 which is also shown as being channel shaped in cross section with its channel facing inwardly, and the corners formed by the longitudinal side frame bars 21 and this rear cross bar 23 being shown as reinforced by gusset plates 24. In addition the truck frame 20 is provided centrally above the tandem axle assembly with a cross frame bar 25 which is channel or pan shaped in cross section with its channel facing downwardly. This cross frame bar 25 is provided with longitudinal flanges 26 projecting horizontally outwardly from the lower edges of the vertical sides thereof and each end of this cross frame bar 25 is secured, as by welding, to the under side of a plate 28 which fits in and is secured, as by welding, to the corresponding internal reinforcing channel 22 of the adjacent longitudinal side frame bar 21 and has a vertical depending flange 29 fitting against and secured to the vertical web of this reinforcing channel 22 as best shown in Fig. 4. Each end of this cross frame bar 25 also rests on and is secured, as by welding, to the upper face of a plate 30 which fits in and is secured, as by welding, to the corresponding internal reinforcing channel 22 of the adjacent longitudinal side frame bar 21 and has a vertical depending flange 31 fitting against and secured to the vertical web of this reinforcing channel 22 as best shown in Fig. 4. The lower horizontal plate 30 can be reinforced by vertical triangular plates 32 and the upper horizontal plate 28 can be reinforced by rectangular vertical plates 33 connecting the horizontal plates 28 and 30 as shown in Fig. 4.

The frame 20 is shown as supported by a pair of tandem axles 35 and 36 which are supported by wheels 38, these wheels being rotatably secured to these axles. One or both groups can be drive wheels, both axles being shown as provided for this purpose with differential housings 39, 40 through which power is transmitted to the drive axle shafts 41, 42 housed within the axles 35, 36 and which are secured to the wheels 38 in the usual and well known manner.

The construction of the tandem axle spring suspension at the left hand side of the truck is the same as the tandem axle spring suspension at the right hand side of the truck and hence a description of the spring suspension at one side of the truck will be deemed to apply to both sides, the same reference numerals being used.

On each end of each axle 35, 36 is mounted an axle bracket or stand 44 which is fast to and extends upwardly therefrom. Each axle bracket or stand is preferably of rectangular form in horizontal section and its upper face 45 is of upwardly curving convex form, the axis of curvature being parallel with the axles. As best shown in Fig. 14, on this curved top face 45 is removably secured a top plate 46 which forms a seat for the main springs and which has a conforming curvature to provide a curved upper face 48. This top plate 46 can be secured in any suitable manner, as by the provision of depending ears 49 at its opposite ends which straddle the axle bracket or stand 44 and are secured thereto by screws 50.

The opposite ends of the lowermost leaf 51 of a conventional group 52 of main leaf springs rest on the convex upper faces 48 of the top plates 46 at each side of the truck.

While the structure 52 is shown as a conventional group of leaf springs, this structure functionally is a load transfer member and could be any elongated generally horizontal supporting member mounted to function as a walking beam. Accordingly each group 52 of leaf springs spans the distance between the corresponding ends of the tandem axles 35, 36 and is supported at its ends thereon. The progressively higher leaves 51a, 51b, 51c, etc. are progressively shorter and thicker, terminating in a short top plate 51f. Lateral outward or inward displacement of each end of each group 52 of leaf springs is prevented by a vertical plate 54 rising from the outside face of each axle bracket or stand 44 and secured thereto by screws 55, these plates extending above the ends of the corresponding spring leaves 51, 51a.

The center of each group 52 of leaf springs has a rocking connection with the vehicle frame 20, this rocker mounting being preferably constructed as follows:

As best illustrated in Figs. 4–6 a main frame bracket or casting, indicated generally at 58, is secured to each longitudinal side frame bar 21 to project outwardly therefrom and be supported by the corresponding group 52 of leaf springs. This frame bracket comprises a pair of generally parallel horizontal side arms 59 of substantial depth and connected by a bottom web 60 which can be reinforced with upstanding ribs 61 and 62 extending between the horizontal side arms 59. Below the group 52 of leaf springs the side arms 59 of the frame bracket can be downwardly indented, as indicated at 63, Fig. 5, to permit rocking movement of the group 52 of leaf springs.

The inner extremity of each side arm 59 of each main frame bracket 58 is formed to provide an eye 64 with a vertical hole 65 through which a vertical bolt 66 extends. Each companion pair of these bolts 66 extends through holes 68 in a horizontal plate 69 which is interposed between the corresponding frame bracket 58 and the underside of the corresponding side frame bar 21, as best shown in Fig. 4. Each companion pair of these vertical bolts 66 also extends through the lower gusset plate 30 for the companion end of the frame cross bar 25 and through the lower horizontal side flanges 26 of this frame cross bar. Each of these vertical bolts 66 also extends through the horizontal flange 70 of a reinforcing angle 71 mounted on each end of each of these side flanges 26 and preferably welded to the cross bar 25 of the frame. A tubular spacer 72 preferably surrounds each of these vertical bolts 66 and is interposed between the main frame bracket 58 and the lower gusset plate 30 of the vehicle frame.

Each side arm 59 of the main frame bracket 58 is also provided with a laterally extending ear 73 through which a vertical bolt 74 extends. Each of these bolts 74 extends through the lower flanges of the main longitudinal side frame bar 21 and its internal reinforcing channel 22 at the corresponding side of the vehicle.

Above each main frame bracket 58 a small vertical rectangular plate 75 is arranged against the outer vertical face of the corresponding longitudinal side frame bar 21 and has its lower edge arranged on and welded to the outer edge of the horizontal plate 69. A short rectangular bar 78 is welded to the plates 69 and 75 so as to be secured to the outside face of the plate 75 and with its lower face coplanar with the lower face of the horizontal plate 69. Against these last lower faces is disposed a flat rocker bearing plate 80 which is disposed between the side arms 59 of the main frame bracket 58. Each flat rocker bearing plate 80 can be secured to the vehicle frame in any suitable manner as by a pair of vertical bolts 81 extending through a bottom backing bar 82 for the flat rocker bearing plate 80, through this rocker bearing plate 80, and through the horizontal plate 69, as best shown in Figs. 4 and 6.

This flat rocker bearing plate 80 mates with an outer flat rocker bearing bar 83, the lower flat surface 84 of which is coplanar with the under flat surface of the flat rocker bearing plate 80. The opposite ends of this outer flat rocker bearing bar 83 are secured to the outer ends of the horizontal parallel arms 59 of the main frame bracket 58 by screws 85. This flat rocker bearing bar 83 is spaced above the rib 62 of the main frame bracket and has a central tongue 86 projecting horizontally toward the truck frame.

A rocker, indicated generally at 90, forms a perch for and engages under surfaces of the flat rocker bearing plate 80 and the flat rocker bearing bar 83 and is secured to the center of the group 52 of leaf springs. For this purpose this rocker has a central elevated part 91 with a flat upper face 92 engaging the central part of the lowermost leaf 51 of the group 52 of leaf springs. This rocker 90 also has a horizontal extension 93 projecting toward the truck frame with a rounded convex upper face 94 engaging the under surface of the flat rocker bearing plate 80. This rocker also has a horizontal extension 95 projecting away from the truck frame with a rounded convex upper face 96 engaging the under surface 84 of the flat rocker bar 83. The curvatures of the rounding convex upper faces 94 and 96 of the extensions 93 and 95 have a common axis parallel with the axles 35, 36 so that the rocker 90 rocks in a direction to permit vertical movement in opposite directions of the opposite ends of the group 52 of leaf springs mounted thereon.

Each group 52 of these leaf springs is secured to its rocker 90 by a pair of the bolts 98, the cross part 99 of each of which, as best shown in Figs. 4 and 5, embraces the corresponding horizontal extension 93 or 95 of the rocker 90 and the upstanding legs 100 of which extend upwardly along the corresponding side of the group 52 of leaf springs and through holes in a top clamping plate 101. The nuts 102 of these U-bolts tighten this top clamping plate against the group 52 of leaf springs to draw this group of leaf springs tightly against the flat upper seat 92 of the rocker 90. The cross parts 99 of the U-bolts 98 can be retained against slipping relative to the rockers 90 by ribs or beads 104 on these rockers.

The group 52 of leaf springs can additionally have the usual yokes 105 and a central vertical bolt 106 to prevent displacement of the leaves 51, 51a, etc.

Each end of each axle 35, 36 is also connected to the frame by a control linkage or mechanism to provide cushioned lateral movement for each axle in either direction and also to render the tandem axles self-steering and also cause the axles to track or follow the steering wheels when making a turn or when traveling straight ahead. This control linkage or mechanism is shown as constructed as follows:

Each axle bracket or stand 44 carries a horizontal tube 110 extending fore-and-aft parallel with the adjacent longitudinal side frame bar 21, this tube being preferably made integral with the axle bracket structure. As best shown in Fig. 13, in each of these tubes 110 is suitably journalled a crank pin 111, the bearings 112 for each of these crank pins 111 being suitably protected by dust seals 113 at the opposite ends of each tube 110 around the enlarged projecting ends 114 of the bearings 112. To each end of each crank pin 111 is keyed, as at 115, the split hub 116 of a pair of spaced crank arms 118 which normally extend horizontally inwardly and have their free ends arranged under the corresponding longitudinal side frame bar 21. The bifurcations 119 of the split hub 116 of each pair of crank arms 118 are shown as drawn together by a series of screws 120 and each pair of carnk arms 118 is preferably reinforced by a web 121 connecting each pair of crank arms to each other and to the split hub 116. On the upper face of each web 121 is mounted a triangular stop 122 which, as best shown in Fig. 8, projects toward the corresponding longitudinal side frame bar 21.

At least one crank arm 118 of each pair, and preferably both, is provided near its hub 116 with a hole 123 extending lengthwise of the frame and in this hole 123 of that crank arm 118 nearest the tube 110 is arranged a bolt 124. As best shown in Figs. 12 and 13, each of these bolts 124 carries a flat thrust bearing plate 125, the bolt 124 extending transversely through one end of this thrust plate 125 and each of these thrust plates also having a hole 126 through which the crank pin 111 extends. Each thrust plate 125 bears against the enlarged external end 114 of the corresponding bearing 112 for the pin 111 and is backed by a plurality of shims 128 each of which is of flat forked form with its bifurcation 129 straddling the pin 111.

It will be seen from Fig. 13 that each thrust plate 125 has thrust engagement with the corresponding bearing 112 to transmit fore-and-aft thrust forces transmitted by the crank arms 118 to the tube 110 and axle bracket 44 from either direction, and that the position of each pair of crank arms 118 can readily be adjusted by using a corresponding number of forked shims 128.

The ends of each pair of crank arms 118 are connected by one shackle pivot pin 130 of a pair of shackle pivot pins 130, 130a which are identical in construction so as to minimize the number of different parts required. A description of one will therefore be deemed to apply to both, the parts of the shackle pivot pin 130a being distinguished by the suffix "a."

As best shown in Fig. 10, each of these shackle pivot pins 130 comprises an enlarged central part 131 interposed and in abutting relation to the corresponding pair of crank arms 118 and having an axial bore 132 therethrough. The opposite ends of this axial bore 132 are threaded to receive the screws 133, 134 each screw 133, 134 extending through a hole 135 in the corresponding crank arm 118. Each screw 133 is provided with a through bore 136 in the outer end of which is screwed a lubricant fitting 138 to the nipple 139 of which a lubricant gun can be applied to force lubricant into the bore. The head of each screw 133, 134 bears against a lock washer 140, this in turn bearing against a flat plate 141 which bears against the face of the corresponding crank arm 118. Each plate 141 covers the end of a key pin 142 which, as best shown in Fig. 10, extends through a bore 143 in the corresponding crank arm 118 and also into a keyway 144 in the adjacent end of the enlarged central part 131 of the corresponding shackle pivot pin 130. The axial bore 132 of the enlarged central part of each shackle pivot pin 130 communicates with radial branch bores 145 leading to the exterior of this enlarged central part 131.

This enlarged central part 131 of each shackle pivot pin 130 is provided with a large, relatively deep helical groove 146 having a relatively long lead, this helical groove extending from one end of the enlarged part 131 of each shackle pivot pin 130 to the opposite end thereof. This long lead helical groove 146 is responsible, as discussed later, for the self-steering character of the tandem axles 35, 36 and for this purpose the shackle pins 130, 130a at opposite sides of the truck are identical except that the enlarged central parts 131 thereof are arranged so that their helical grooves 146 are pitched in reverse relation to each other.

Each companion pair of these shackle pivot pins 130, 130a are connected by a two part shackle indicated generally at 150 and preferably constructed as follows:

Each shackle 150 is made of counterpart castings 151 which are generally rectangular in elevation and each of which has a pair of parallel grooves 152 along its upper and lower edges. In each of these grooves each half shackle 151 is formed to provide a thread 153, as best shown in Fig. 18, which fits the groove 146, 146a of the enlarged part 131, 131a of the corresponding shackle pin 130, 130a. Each pair of half shackles 151 are drawn together and held in threaded, embracing relation with the corresponding pair of shackle pins 130, 130a by a pair of bolts 154 which, as best shown in Fig. 11, extend through the half shackles intermediate the companion pair of shackle pins 130, 130a. To prevent the escape of lubricant each half shackle 151 is provided along opposite sides of each of its threaded grooves 152 with a pair of shallow grooves 155, each of these shallow grooves 155 registering with a shallow groove 155 of the companion half shackle 151 and each companion pair of these shallow grooves 155 retaining a strip 156 of rubber or the like which provides a barrier against the escape of lubricant from the corresponding threaded groove 152.

The end screws 133a, 134a of each shackle pin 130a are anchored in holes 160 through a pair of ears 161, as best shown in Fig. 10. The keys 142a extend through the holes 143a in these ears and also through the keyways 144a of the enlarged central part 131a of each shackle pin 130a to prevent these shackle pins 130a from turning relative to these ears 161.

Each pair of these anchoring ears 161, as best shown in Figs. 8 and 9, project downwardly from the horizontal part 162 of a frame bracket indicated generally at 163, this frame bracket 163 having an upstanding part 164 which is held against the corresponding longitudinal side frame bar 21 by a U-bolt 165 and having a depending part 166 which reinforces the ears 161.

Figure 2:
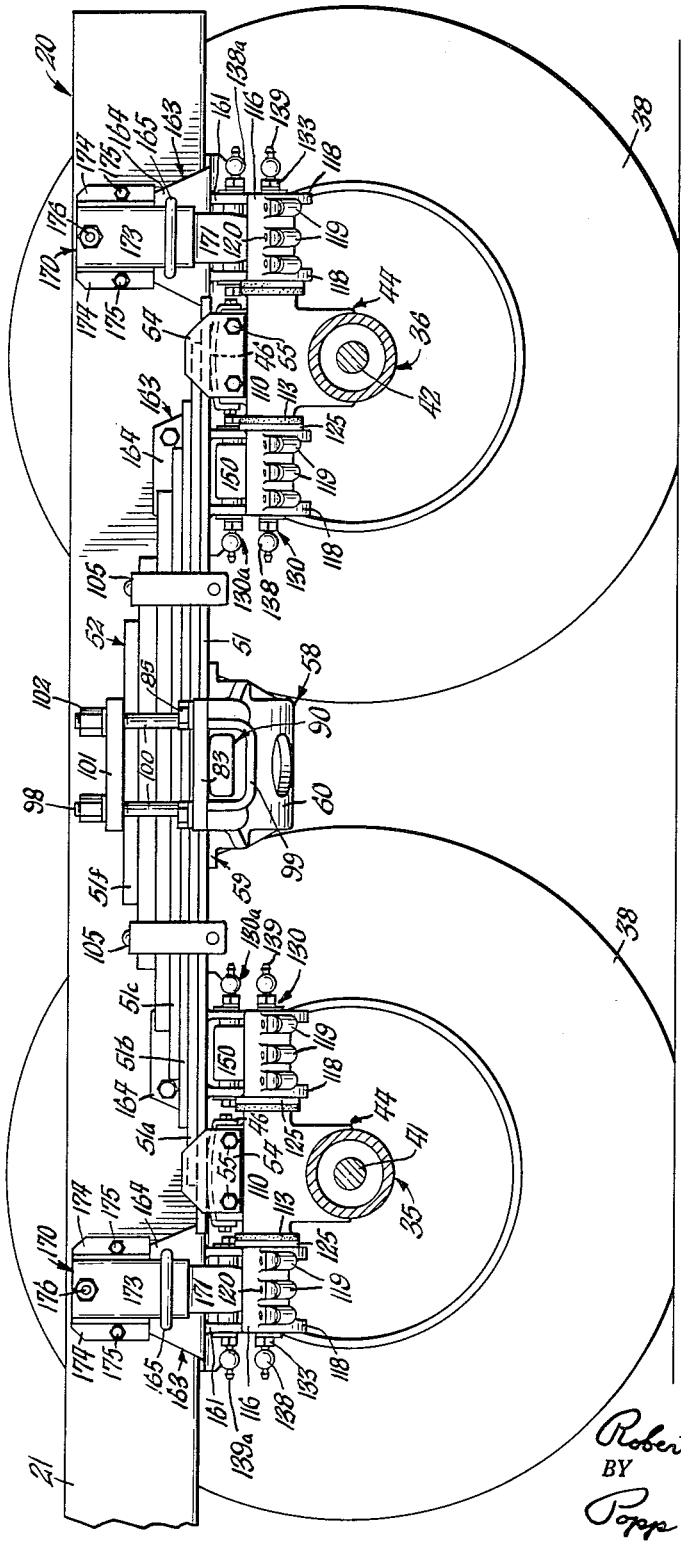
Fig. 2 is a vertical sectional view taken generally on line 2—2, Fig. 3.

Each U-bolt 165 also embraces the tubular holder 170 for a heavy vertical leaf spring 171 and a light vertical leaf spring 172. Each holder 170 is in the form of a vertical tube 173 which is rectangular in horizontal section with its lower end fitted against the upstanding part 164 of the frame bracket 163 and held thereto by its U-bolt 165. The upper part of each vertical tube 173 is provided with a pair of ears 174 which lay against the outside vertical face of the side frame bar 21 and are each secured thereto by a screw 175 as best shown in Figs. 1 and 2.

Each heavy vertical leaf spring 171 is toward the outside, as compared with the light vertical leaf spring 172 and projects downwardly from the tube 173 into the path of the triangular stop 122 on the web 121 of the corresponding control crank arm 118 and yieldingly limits the movement of this control crank arm 118 toward the frame 20. Each lighter leaf spring 172 is arranged in the path of the corresponding shackle 150 and yieldingly limits the outward movement of this shackle. Each pair of heavy and light leaf springs is retained in operative position by a bolt 176 which, as best shown in Fig. 8, extends through two sides of the tube 173 of the spring holder 170 and through holes in the upper ends of the corresponding pair of springs 171, 172. The position of these springs 171, 172 is such that the light spring 172 engages its shackle 150 before the triangular stop 122 at the opposite end of the corresponding axle engages its heavy spring 171. Accordingly it will be seen that extreme lateral movement of either axle 35, 36 in either direction will first be resiliently cushioned by a light leaf spring 172 and then resiliently cushioned and stopped by a heavy leaf spring 171.

Operation

In the operation of the suspension the upward movement of one end of, say, the front axle 35, through its axle bracket or stand 44 and the top plate 46 mounted thereon, moves the front end of the corresponding group 52 of leaf springs upwardly. This upward pressure is transmitted through the clamping plate 101 and U-bolts 98 at the center of this group 52 of leaf springs to the horizontal opposite extensions 93 and 95 of the rocker 90. This upward pressure is transmitted by the curved upper faces 94 and 96 of these extensions 93 and 95 to the flat rocker bearing plate 80 (Fig. 4) and the flat rocker bearing bar 83. The upward pressure against the flat rocker bearing plate 80 is transmitted through the plate 69 directly to the corresponding main longitudinal frame bar 21 of the frame 20, and the upward pressure against the flat rocker bearing bar 83 is transmitted through the main frame bracket 58 similarly to the corresponding main longitudinal frame side bar 21.

The upward movement of the front end of the group 52 of leaf springs causes the curving surfaces 94 and 96 of the extensions 93 and 95 of its rocker 90 to rock on the undersurfaces of the flat rocker bearing plate 80 and the flat rocker bearing bar 83. This rocking or pivoting of the center of the group 52 of main leaf springs causes a downward pressure to be transmitted by the rear end of this group of main leaf springs through the top plate 46 of the axle bracket or stand 44 of the rear axle 36. Accordingly the upward movement of one end of the front axle 35 is transmitted through the group 52 of main leaf springs as a downward pressure on the corresponding end of the rear tandem axle 36 thereby to equalize the load upon the two axles and effect so-called load transfer or axle compensation.

A feature of the invention resides in permitting a controlled movement of the tandem axles laterally, that is, in the direction of their axes, in either direction. Thus when an axial force is impressed, say, on the front axle 35 so as to shift it laterally, this force is transmitted through its axle brackets or stands 44 and the top plates 46 thereof to the front ends of the two groups 52 of main leaf springs. This causes a slight turning movement of the centers of these groups of main leaf springs about vertical axes, this turning of these groups of springs in a horizontal direction being permitted by the rounding upper faces 94 and 96 of the extensions 93 and 95 of the rockers 90 to which the groups of springs are secured.

An important feature of the invention resides in the control linkage or mechanism connecting each end of each axle with the frame so as to not only yieldingly limit the amount of such lateral movement of either axle but also to effect a self-steering action of both tandem axles.

Thus, the assumed lateral movement of the front tandem axle 35 causes, through the crank pins 111 (Fig. 13) journalled in the axle brackets 44 of the front axle, a lateral movement of the crank arms 118 fast to these crank pins 111. This movement is transmitted by these crank arms to the shackles 150 (Fig. 8) which pivot about their pivotal connections 130a between these shackles and the frame 20. Accordingly, one of these shackles 150 is moved toward the lighter leaf spring 172 projecting down from the corresponding longitudinal side frame bar 21 and hence with extreme lateral movement of the front axle 35, this movement is initially resiliently retarded by this light depending leaf spring 172.

With a still greater lateral movement of the front axle 35 in the assumed direction, the triangular stop 122 on the hub 116 of the crank arms 118 at the opposite side of the vehicle engages the heavy depending leaf spring 171. This heavy leaf spring 171 serves to resiliently cushion and also limit such extreme lateral movement of the front axle.

The maximum movement of the rear tandem axle 36 is yieldingly limited by its pairs of light and heavy depending leaf springs 172, 171 in the same manner as with the front axle 35 as above described.

The self steering of the tandem axles is obtained through the internal threads 153 of the two part shackles 150 in the helical grooves 146 of the shackle pivot pins 130, 130a as illustrated in Figs. 8-11. Thus when the vehicle makes a turn in the road, the tires of each of the axles 35, 36 tend to resist the scuffing which otherwise would occur and in doing so push each axle laterally of the frame to eliminate this scuffing. Confirming our attention to, say, the front tandem axle 35, this lateral or axial axle movement on making a turn causes the two part shackles 150 at its opposite ends to swing about the shackle pivot pins 130, 130a in a corresponding direction, that is, one shackle 150 will swing out and the other shackle 150 will swing in but both will rotate in the same angular direction. Since all of the shackle pivot pins 130, 130a are provided with the long lead helical grooves 146 and since the two halves 151 of the shackles for these shackle pins are provided with the long lead helical threads 153 fitting these grooves, and since the shackle pin 130a is held against axial displacement relative to the frame 20, and since the shackle pin 130 is held against axial displacement relative to the front tandem axle 35, it will be seen that such rotation or oscillation of the shackles 150 relative to their shackle pins 130, 130a will cause endwise displacement of each pair of shackle pins 130, 130a relative to each other. Since the shackle pin 130a is held against endwise displacement relative to the frame 20 and the shackle pin 130 held against endwise displacement relative to the front tandem axle 35 being considered, it will be seen that such endwise displacement of each pair of shackle pins 130, 130a relative to each other will cause a corresponding fore-and-aft displacement of the corresponding front end of the front tandem axle 35 relative to the frame 20. The helical grooves 146, 146a in the shackle pins 130, 130a at one end of the front axle 35 spiral in the opposite direction from the grooves 146, 146a in the axle pivot pins 130, 130a at the opposite end of this axle. Accordingly, on rounding a curve and with such endwise movement of the axle 35 causing its shackles 150 to swing relative to their shackle pivot pins 130, 130a, one end of the axle 35 is moved rearwardly, relative to the vehicle frame 20, by the helical grooves 146, 146a in the adjacent shackle pins 130, 130a while the opposite end of the axle 35 is moved forwardly, relative to the vehicle frame 20, by the helical grooves 146, 146a in the other shackle pivot pins 130, 130a. The helical grooves 146, 146a are, of course, arranged to spiral in that direction to cause the axle 35 to steer in the direction to correspond to the turn being made by the truck. That is, these helical grooves 146, 146a spiral in the directions such that when making, say, a left hand turn, the helical grooves 146, 146a in the left hand shackle pivots 130, 130a will cause a rearward movement, relative to the vehicle frame 20, of the left hand end of the axle 35 whereas the helical grooves 146, 146a in the right hand shackle pivot pins 130, 130a will cause a forward movement, relative to the vehicle frame 20, of he right hand end of the axle 35.

Figs. 15, 16 and 17 illustrate the position of the control linkage parts under normal loaded, extreme downward body movement and extreme rebound movement, respectively. It will be noted that for normal vertical axle movement, that is, an inch or so plus or minus, the spring leaves 172, 171 are not engaged. With extreme downward movement of the frame, however, as illustrated in Fig. 16, the shackles 150 engage first the light spring 172 and then the combined springs 172, 171. Also on extreme rebound, as illustrated in Fig. 17, the shackles 150 similarly engage these springs 172, 171. Accordingly under extreme axle movements these springs 172, 171 yieldingly center the axles with reference to the frame.

Vertical movement of either axle, with both ends rising uniformly, has no steering effect since the shackles 150 move in opposite angular directions in contrast to their movement in the same angular direction under the influence of lateral axle movement. Accordingly such vertical axle movement of the axles merely results in a slight fore-and-aft movement of the axles under the influence of the long lead threaded shackle pins 130, 130a. Extreme upward movement of one end of either axle will result in a slight movement of the axle by the threaded shackle pins 130, 130a, but this is of no significance with highway vehicles where such extreme movements of one end of an axle are rare but where self-steering of the axles around curves is of great importance particularly in tire wear and gasolene economy.

This description of the self-steering action of the front tandem axle 35 caused by its helically grooved shackle pivot pins 130, 130a applies also to the rear tandem axle 36 which is similarly provided with pairs of helically grooved shackle pivot pins 130, 130a.

With such helically grooved shackle pivot pins, when the truck is making a turn, the tandem axles can be caused to automatically move to such oblique position relative to each other as will cause their axes to intersect the axes of rotation of the two front or steering wheels (not shown) of the truck and thereby enable the truck to make the turn without tire scuffing. This action occurs when either the vehicle is steered around a long turn in the road or when it is steered sharply on a straight road, as for instance, when overtaking a slow vehicle ahead, or otherwise avoiding some obstruction. It will also be seen that this self-steering action takes place to some extent when a tendency to tire scuffing occurs because of one wheel or a pair of wheels having a diameter different from the diameter of the wheel or pair of wheels at the other end of the same axle.

The helical grooves 146, 146a of the shackle pins 130, 130a also tends to cause each axle 35, 36 to centralize itself in a direction transverse of the frame and resists movement of either axle away from its central position. This permits the vehicle frame 20 to move substantially straight ahead despite a certain amount of lateral movement or positioning of the axles. Thus, when the vehicle is traveling straight ahead, if the tandem axles 35, 36 are not parallel for any reason, they will automatically assume a parallel position because of the fact that if, for example, the rear axle 36 is out of line, it will tend to follow a horizontal arc, and this tendency, due to the lateral friction between the tires and the roadway, will cause a lateral movement of the axle relative to the frame. This lateral movement is automatically caused to be translated, because of the helical grooves 146, 146a of the shackle pins 130, 130a into a slight turning movement, in a horizontal plane of the whole axle, and this turning movement will continue until both the tandem axles are in line with each other.

It will also be seen that the construction of the two part shackles 150 is very simple and that they can be made in the form of two part castings at very low cost. At the same time adequate lubrication is provided for the shackle pins 130, 130a and lubricant can be readily applied to these shackle pins by the oil fittings 138, 138a.

From the foregoing it will be seen that the present invention provides a very simple tandem axle suspension which employs a heavy duty leaf spring but in such manner as to provide both axle compensation or load transfer from one tandem axle to the other and also to permit lateral movement of the two tandem axles. It will further be seen that a simple control mechanism is provided at each end of each axle to resiliently limit the amount of such lateral axle movement and also to render the tandem axles self-steering in making a turn in the road and to aline the axles with each other when going straight ahead, tire scuffing, as well as loss of power, being thereby avoided in each instance.

As previously indicated while the structure 52 is desirably in the form of a leaf spring, it is essentially a load transfer supporting member or walking beam and the resilience for the suspension could be supplied elsewhere.

I claim:

1. A tandem axle vehicle suspension adapted to be interposed between a vehicle frame and a pair of tandem axles each having wheels journalled thereon, comprising a frame bracket secured to each side of said frame intermediate said tandem axles and having a downwardly facing bearing face, an elongated generally horizontal supporting member arranged adjacent each bracket and having at its center an upwardly facing bearing face forming a perch engaging and supporting the corresponding downwardly facing bearing face, the curvature of one of said bearing faces, in a direction lengthwise of the vehicle frame, being different from the curvature of the other bearing face whereby said bearing faces have rocking engagement with each other to permit rocking of each of said elongated supporting members about an axis generally parallel with said axles, and means connecting the opposite ends of each of said elongated supporting members with the corresponding tandem axles.

2. A tandem axle vehicle suspension adapted to be interposed between a vehicle frame and a pair of tandem axles each having wheels journalled thereon, comprising a frame bracket secured to each side of said frame intermediate said tandem axles and having a downwardly facing bearing face, an elongated generally horizontal supporting member arranged adjacent each bracket and having at its center an upwardly facing bearing face forming a perch engaging and supporting the corresponding downwardly facing bearing face, said engaging bearing faces permitting opposite horizontal movement of the opposite ends of each generally horizontal member, the curvature of one of said bearing faces, in a direction lengthwise of the vehicle frame, being different from the curvature of the other bearing face whereby said bearing faces have rocking engagement with each other to permit rocking of each of said elongated supporting members about an axis generally parallel with said axles, and means connecting the opposite ends of each of said elongated supporting members with the corresponding tandem axles.

3. A tandem axle vehicle suspension adapted to be interposed between a vehicle frame and a pair of tandem axles each having wheels journalled thereon, comprising a frame bracket secured to each side of said frame intermediate said tandem axles and having a downwardly facing bearing face, an elongated generally horizontal supporting member arranged adjacent each bracket and having at its center an upwardly facing bearing face engaging and supporting the corresponding downwardly facing bearing face, the curvature of one of said bearing faces, in a direction lengthwise of the vehicle frame, being different from the curvature of the other bearing face whereby said bearing faces have rocking engagement with each other to permit rocking of each of said elongated supporting members about an axis generally parallel with said axles, and means connecting the opposite ends of each of said elongated supporting members with the corresponding tandem axles, said bearing faces also permitting movement of each elongated supporting member about a vertical central axis to permit movement of said axles laterally with reference to said frame.

4. A tandem axle vehicle suspension adapted to be interposed between a vehicle frame and a pair of tandem axles each having wheels journalled thereon, comprising a frame bracket secured to each side of said frame intermediate said tandem axles and having a downwardly facing bearing face, which is fixed with reference to said frame bracket, a member arranged below each of said frame brackets and having an upwardly facing bearing face which is fixed with reference to said member and forms a perch engaging and supporting the corresponding downwardly facing bearing face, one of said bearing faces having a different degree of curvature, lengthwise of the vehicle frame, than the other of said bearing faces to permit rocking of said rocker on an axis generally parallel with said axles, an elongated generally horizontal supporting member centrally carrying each of said first members, and means connecting the opposite ends of each of said elongated supporting members with the corresponding tandem axles.

5. A tandem axle vehicle suspension adapted to be interposed between a vehicle frame and a pair of tandem axles each having wheels journalled thereon, comprising a frame bracket secured to each side of said frame intermediate said tandem axles and having a downwardly facing bearing face, a member arranged below each of said frame brackets and having an upwardly facing bearing face forming a perch engaging and supporting the corresponding downwardly facing bearing face, one of said bearing faces having a different degree of curvature, lengthwise of the vehicle frame, than the other of said bearing faces to permit rocking of said rocker on an axis generally parallel with said axles, an elongated generally horizontal supporting member centrally carrying one of said first members, and means connecting the opposite ends of each of said elongated supporting members with the corresponding tandem axles, said bearing faces also permitting frictional movement of each elongated supporting member about a vertical central axis to permit movement of said axles laterally with reference to said frame.

6. A tandem axle vehicle suspension adapted to be interposed between a vehicle frame and a pair of tandem axles each having wheels journalled thereon, comprising a frame bracket secured to each side of said frame intermediate said tandem axles and having a downwardly facing bearing face, an elongated generally horizontal supporting member arranged adjacent each frame bracket and having at its center an upwardly facing bearing face forming a perch engaging and movably supporting the corresponding downwardly facing bearing face, one of said bearing faces being curved differently from the other bearing face to permit rocking of each of said elongated supporting members on an axis generally parallel with said axles, spaced axle brackets rising from each of said axles and having an upper convex surface curved about an axis generally parallel with said axles and forming a perch frictionally supporting the corresponding end of a companion elongated supporting member, and a flange rising from the side of each axle bracket alongside the companion elongated supporting member to retain engagement of said companion elongated supporting member with said convex surface.

7. A tandem axle vehicle suspension adapted to be interposed between a vehicle frame and a pair of tandem axles each having wheels journalled thereon, comprising a frame bracket secured to each side of said frame intermediate said tandem axles and projecting outwardly from said frame, a downwardly facing rocker bearing plate secured to said frame in vertical alinement with each of said frame brackets, a rocker bearing bar at the outer end of each of said brackets and having its under face coplanar and spaced from the under face of said rocker bearing plate, a rocker having horizontal extensions each with a convex upper face engaging one of said under faces to permit rocking of said rocker on an axis parallel with said axles, an elongated generally horizontal supporting member secured adjacent its center to the upper side of said rocker intermediate its extensions, and means connecting the opposite ends of each of said elongated supporting members with the corresponding ends of said pair of tandem axles.

8. A tandem axle vehicle suspension adapted to be interposed between a vehicle frame and a pair of tandem axles each having wheels journalled thereon, comprising a frame bracket secured to each side of said frame intermediate said tandem axles and projecting outwardly from said frame, a downwardly facing rocker bearing plate secured to said frame in vertical alinement with each of said frame brackets, a rocker bearing bar at the outer end of each of said brackets and having its under face coplanar and spaced from the under face of said rocker bearing plate, a rocker having horizontal extensions each with a convex upper face engaging one of said under faces to permit rocking of said rocker on an axis parallel with said axles, an elongated, generally horizontal supporting member secured adjacent its center to the upper side of said rocker intermediate its extensions, and an axle bracket rising from each end of each of said axles and having an upper surface frictionally supporting the corresponding end of a companion elongated supporting member, said faces permitting movement of each elongated supporting member about a vertical central axis to permit movement of said axles laterally with reference to said frame.

9. A tandem axle vehicle suspension adapted to be interposed between a vehicle frame and a pair of tandem axles each having wheels journalled thereon, comprising a frame bracket secured to each side of said frame intermediate said tandem axles and having a downwardly facing bearing face, an elongated generally horizontal supporting member arranged adjacent each axle bracket and having at its center an upwardly facing bearing face forming a perch engaging and supporting the corresponding downwardly facing bearing face, said engaging bearing faces permitting opposite horizontal movement of the opposite ends of each generally horizontal member, the curvature of one of said bearing faces, in a direction lengthwise of the vehicle frame, being different from the curvature of the other bearing face whereby said bearing faces have rocking engagement with each other to permit rocking of each of said elongated supporting members about an axis generally parallel with said axles, means movably connecting the opposite ends of each of said elongated supporting members with the corresponding ends of said pair of tandem axles, and a linkage pivotally connecting each end of each of said axles with said frame.

10. A tandem axle vehicle suspension adapted to be interposed between a vehicle frame and a pair of tandem axles each having wheels journalled thereon, comprising a frame bracket secured to each side of said frame intermediate said tandem axles and having a downwardly facing bearing face, an elongated generally horizontal supporting member arranged adjacent each axle bracket and having at its center an upwardly facing bearing face forming a perch engaging and supporting the corresponding downwardly facing bearing face, means movably connecting the opposite ends of each of said elongated supporting members with the corresponding ends of said pair of tandem axles, a linkage pivotally connecting each end of each of said axles with said frame and comprising a crank arm fulcrumed on each end of said axles to swing about a horizontal axis generally perpendicular to its axle and projecting toward said frame, and a shackle pivoted at one end to the free end of said crank arm and pivoted at its other end to said frame.

11. A tandem axle vehicle suspension adapted to be interposed between a vehicle frame and a pair of tandem axles each having wheels journalled thereon, comprising a frame bracket secured to each side of said frame intermediate said tandem axles and having a downwardly facing bearing face, a member arranged below each of said frame brackets and having an upwardly facing bearing face, an elongated generally horizontal supporting member secured adjacent its center to said first member, an axle bracket rising from each end of each of said axles and having an upper surface frictionally supporting the corresponding end of a companion elongated supporting member, said bearing faces permitting movement of each elongated supporting member about a vertical central axis to permit movement of said axles laterally with reference to said frame, and a linkage pivotally connecting each end of each of said axles with said frame and comprising a crank arm pivot pin fulcrumed in each of said axle brackets to swing about a horizontal axis generally perpendicular to its axle, a crank arm fast to each end of said crank pin and projecting toward said frame, a shackle pin connecting the free ends of each pair of said crank arms, a shackle having its lower end journalled on said shackle pin intermediate said crank arms, and a second shackle pin carried by said frame and journalled in the upper end of the corresponding shackle.

12. A tandem axle vehicle spring suspension adapted to be interposed between a vehicle frame and a pair of tandem axles each having wheels journalled thereon, comprising a normally horizontal crank arm fulcrumed on each end of each of said axles to swing about a horizontal axis generally perpendicular to its axle and projecting toward said frame, a shackle pivot pin at the free end of said crank arm and arranged generally parallel with said fulcrum axis, a shackle journalled at one end on said shackle pivot pin, a second shackle pivot pin journalled in the other end of said shackle parallel with the first shackle pivot pin, means arranged to connect said second shackle pivot pin with said frame, a long lead helical thread on at least one of said shackle pivot pins and working in a long lead helical groove provided in said shackle whereby movement of said axles laterally of said frame is translated into a turning movement of said axles about a vertical central axis, and spring means resiliently supporting said frame on said axles.

13. A tandem axle vehicle spring suspension adapted to be interposed between a vehicle frame member and a tandem axle member having wheels journalled thereon, comprising a normally horizontal crank arm at each end of said axle member and fulcrumed on one of said members to swing about a horizontal axis generally perpendicular to said axle member, a shackle pivot pin at the free end of each crank arm and arranged generally parallel with said fulcrum axis, a shackle journalled at one end on said shackle pivot pin, a second shackle pivot pin journalled in the other end of said shackle parallel with the first shackle pivot pin, means arranged to connect said second shackle pivot pin with the other of said members, a long lead helical thread on each of said shackle pivot pins and working in corresponding long lead helical grooves provided in said shackle whereby movement of said axle member laterally of said frame member is translated into a turning movement of said axle member about a vertical central axis, and spring means resiliently supporting said frame member on said axle member.

14. A tandem axle vehicle spring suspension adapted to be interposed between a vehicle frame member and a tandem axle member having wheels journalled thereon, comprising a normally horizontal crank arm at each end of said axle member and fulcrumed on one of said members to swing about a horizontal axis generally perpendicular to said axle member, a shackle pivot pin at the free end of each crank arm and arranged generally parallel with said fulcrum axis, a shackle including two halves with registering parallel grooves at its opposite ends jointly forming parallel bores in one of which said shackle pivot pin is journalled and means securing said two halves of said shackle together, a second shackle pivot pin journalled in the other of said bores, means arranged to connect said second shackle pivot pin with the other of said members, a long lead helical thread on at least one of said shackle pivot pins and working in a long lead helical groove provided in the corresponding bore of said shackle whereby movement of said axle member laterally of said frame is translated into a turning movement of said axle member about a vertical central axis, and spring means resiliently supporting said frame member on said axle member.

15. A tandem axle vehicle spring suspension adapted to be interposed between a vehicle frame and a pair of tandem axles each having wheels journalled thereon, comprising spring means yieldingly supporting said frame on said axles and permitting movement of said axles laterally of said frame, and means limiting such lateral movement of each of said axles relative to said frame, comprising a crank arm fulcrumed on each end of each of said axles to swing about a horizontal axis generally perpendicular to its axle and projecting toward said frame, a shackle pivoted at one end to the free end of said crank arm and pivoted at its other end to the frame, and a spring leaf anchored on said frame and projecting along the outer side of each of said shackles to limit the outward swinging movement thereof.

16. A tandem axle vehicle spring suspension adapted to be interposed between a vehicle frame and a pair of tandem axles each having wheels journalled thereon, comprising spring means yieldingly supporting said frame on said axles and permitting movement of said axles laterally of said frame, and means limiting such lateral movement of each of said axles relative to said frame, comprising a crank arm fulcrumed on each end of each of said axles to swing about a horizontal axis generally perpendicular to its axle and projecting toward said frame, a shackle pivoted at one end to the free end of said crank arm and pivoted at its other end to the frame, a spring leaf anchored on said frame and projecting along the outer side of each of said shackles to limit the outward swinging movement thereof, and a backing plate anchored on said frame and extending along the outer side of each of said spring leaves to limit the outward flexure thereof.

17. A tandem axle vehicle spring suspension adapted to be interposed between a vehicle frame and a pair of tandem axles each having wheels journalled thereon, comprising spring means yieldingly supporting said frame on said axles and permitting movement of said axles laterally of said frame, and means limiting such lateral movement of each of said axles relative to said frame, comprising a crank arm fulcrumed on each end of each of said axles to swing about a horizontal axis generally perpendicular to its axle and projecting toward said frame, a shackle pivoted at one end to the free end of said crank arm and pivoted at its other end to the frame, a spring leaf anchored on said frame and projecting along the outer side of each of said shackles to limit the outward swinging movement thereof, a backing plate anchored on said frame and extending along the outer side of each of said spring leaves to limit the outward flexure thereof, and a stop on each of said crank arms and engageable with the outer face of the corresponding backing plate.

18. In a tandem axle vehicle spring suspension adapted to be interposed between a vehicle frame and a pair of tandem axles each having wheels journalled thereon, a linkage connecting an end of at least one of said axles to said frame, comprising an axle bracket on said axle end, a generally horizontal fulcrum pin journalled in and with its opposite ends projecting from said axle bracket along an axis generally perpendicular to said axle end, a crank arm having a bifurcated hub embracing each projecting end of said fulcrum pin, means drawing the parts of said bifurcated hubs together to clamp said crank arms to said pin, an ear projecting radially from each hub at the end thereof adjacent said axle bracket, a thrust plate interposed between each hub and said axle bracket and embracing said fulcrum pin, a removable fastening extending through each thrust plate and the adjacent ear, at least one shim penetrated by one of said fastenings and interposed between the corresponding ear and its companion thrust plate and having forked ends embracing said pin, and a shackle connecting the free end of each crank arm with said frame.

References Cited in the file of this patent
UNITED STATES PATENTS

| | | |
|---|---|---|
| 1,743,868 | Royer | Jan. 14, 1930 |
| 2,193,567 | Pointer | Mar. 12, 1940 |
| 2,579,556 | Drong | Dec. 25, 1951 |